United States Patent [19]
Okada

[11] Patent Number: 5,574,465
[45] Date of Patent: Nov. 12, 1996

[54] PORTABLE ASTRONOMIC/METEORIC OBSERVATION SYSTEM

[75] Inventor: Setsuo Okada, Hokkaido, Japan

[73] Assignee: Hudson Soft Co., Ltd., Hokkaido, Japan

[21] Appl. No.: 390,262

[22] Filed: Feb. 15, 1995

Related U.S. Application Data

[63] Continuation of Ser. No. 160,754, Dec. 3, 1993, abandoned.

[30] Foreign Application Priority Data

Oct. 21, 1993 [JP] Japan ..................... 5-285722

[51] Int. Cl.⁶ ..................... H04B 7/185
[52] U.S. Cl. ............ 342/352; 364/455; 342/357
[58] Field of Search ............ 342/352, 357; 364/455

[56] References Cited

U.S. PATENT DOCUMENTS

| 4,453,224 | 6/1984 | Crooks, Jr. ............ 364/525 |
| 4,682,091 | 7/1987 | Krewalk et al. ......... 318/685 |
| 5,075,693 | 12/1991 | McMillan et al. ....... 342/457 |
| 5,109,346 | 4/1992 | Wertz .................. 364/459 |
| 5,268,844 | 12/1993 | Carver et al. .......... 364/443 |
| 5,293,355 | 3/1994 | Widen et al. . |
| 5,347,497 | 9/1994 | Allen .................. 368/19 |

FOREIGN PATENT DOCUMENTS

| 41 32 977 | 4/1993 | Germany . |
| 42 22 307 | 1/1994 | Germany . |
| 60-164290 | 8/1985 | Japan . |
| 61-22286 | 1/1986 | Japan . |
| 4-297882 | 10/1992 | Japan . |
| 5002064 | 1/1993 | Japan . |
| WO93/05474 | 3/1993 | WIPO . |

OTHER PUBLICATIONS

IEEE International Conference on Consumer Electronics, Digest of Technical Papers, Jun. 8–10, 1988, pp. 118–119.

Primary Examiner—Theodore M. Blum
Attorney, Agent, or Firm—Lowe, Price, LeBlanc & Becker

[57] ABSTRACT

A natural environment observation system has a GPS for detecting the present location (address), a calendar for providing the present date and time, a memory for storing natural phenomenon data, such as astronomical data, oceanic data, etc.; and an arithmetic unit for processing the natural phenomenon data, in accordance with the present location and time and the kind of information to be observed.

16 Claims, 10 Drawing Sheets

| | |
|---|---|
| TIME | JANUARY 6, 1993  PM 9:00 |
| SITUATION | Lat. 35°N |
| | Long. 135°E |
| | 318m above sea level |

- ☐ WHOLE SKY VIEW
- ☐ MIDDLE/APPEARANCE
- ☐ CONSTELLATION LIST
- ☐ ASTRONOMICAL OBSERVATION GUIDE
- ☐ SUNRISE/SUNSET
- ☐ MOONRISE/MOONSET
- ☐ HIGH TIDE/LOW TIDE

| | |
|---|---|
| TIME | JULY 7, 1993  PM 9:00 |
| SITUATION | Lat. 35°N.  Long. 135°E. |
| CONSTELLATION | CASSIOPEIA |
| POSITION OF CONSTELLATION | ELEVATION  50°.46 <br> AZIMUTH  350°.53 |
| APPEARANCE TIME | PM 7:10 ~ AM 3:15 |

ANECDOTE : Cassiopeia is · · ·
· · · omitted · · ·

PORTABLE ASTRONOMIC/METEORIC OBSERVATION SYSTEM

This application is a continuation of application Ser. No. 08/160,754, filed Dec. 3, 1993, now abandoned.

BACKGROUND OF THE INVENTION

This invention relates to a natural environment observation system used for observing natural phenomenon, such as astronomical and oceanic information.

A conventional natural environment observation system is described in a Japanese laying open publication (Kokai) Heisei 4-297882, as a satellite navigation receiver. In this satellite navigation receiver, information on the latitude, longitude, height above sea level at the present address and information on orbits of constellations are supplied from a satellite navigation receiver (GPS) and a memory, respectively, to an arithmetic unit. The arithmetic unit calculates the elevation and azimuth angles of the constellations, and calculates the appearance times of the constellations in accordance with the elevation and azimuth angles; anybody can observe for a required constellation easily.

According to the conventional natural environment navigation system, however, it is difficult to observe required information timely. Further, it tends to miss observing the required constellation in the good situation.

SUMMARY OF THE INVENTION

Accordingly, it is an object of the invention to provide a natural environment observation system by which the required information may be observed timely.

It is another object of the invention to provide a natural environment observation system by which required information can be observed certainly in the good situation.

According to the invention, a natural environment observation system includes means for detecting the present location (address); means for providing the present date and time; means for storing natural phenomenon data, such as astronomical data, oceanic data, etc.; and means for processing the natural phenomenon data, in accordance with the present location and time and the kind of information to be observed.

BRIEF DESCRIPTION OF THE DRAWINGS

FIG. 9 is an explanatory diagram showing tide data stored in an IC card used in the observation system.

2

DETAILED DESCRIPTION OF THE INVENTION

Figure 1:
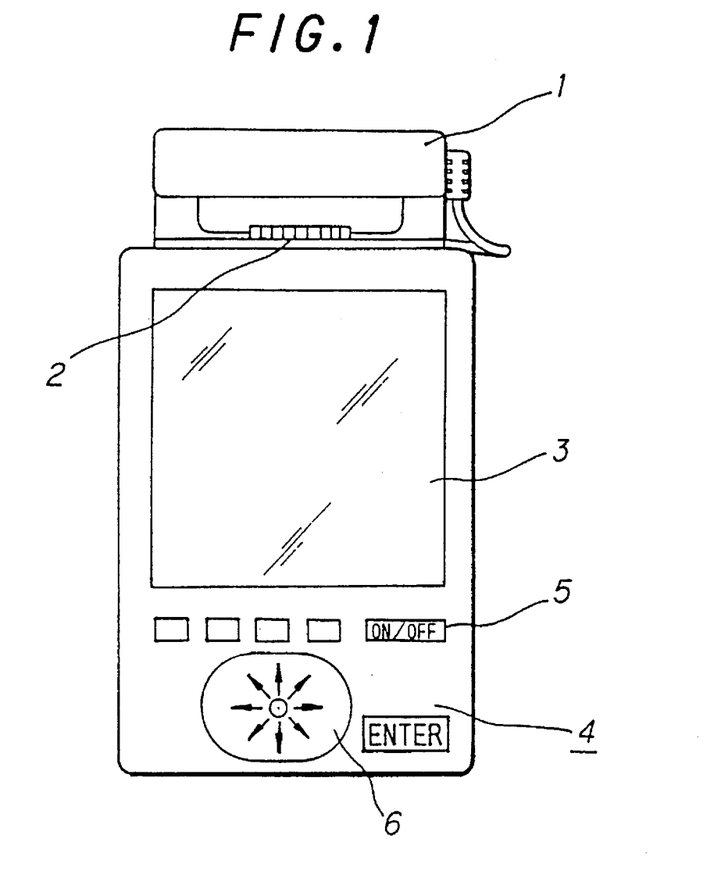
FIG. 1 is a front view showing a natural environment observation system according to a first preferred embodiment of the invention.
Figure 2:
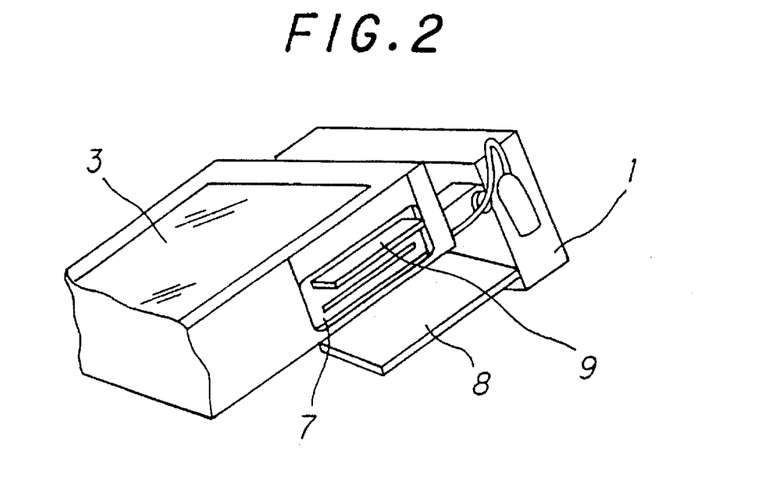
FIG. 2 is a perspective view illustrating a part of the observation system shown in FIG. 1.

FIGS. 1 and 2 show a natural environment observation system according to a first preferred embodiment of the invention, which includes an antenna 1 for receiving radio waves from a plurality of artificial satellites, a fixer knob 2 for fixing the antenna 1, an LCD (Liquid Crystal Display) for displaying a variety of information, a keyboard 4 having a power switch 5, a control 6 and key buttons, a card setting portion 7 with a cover 8 for setting an IC card 9, and a printer (not shown) for printing a variety of information.

The IC card 9 stores phenomenon data of natural environment, for example, the orbits of the sun, moon, Jupiter and constellations, tide information, mean number of alternations of the tide.

Figure 3:
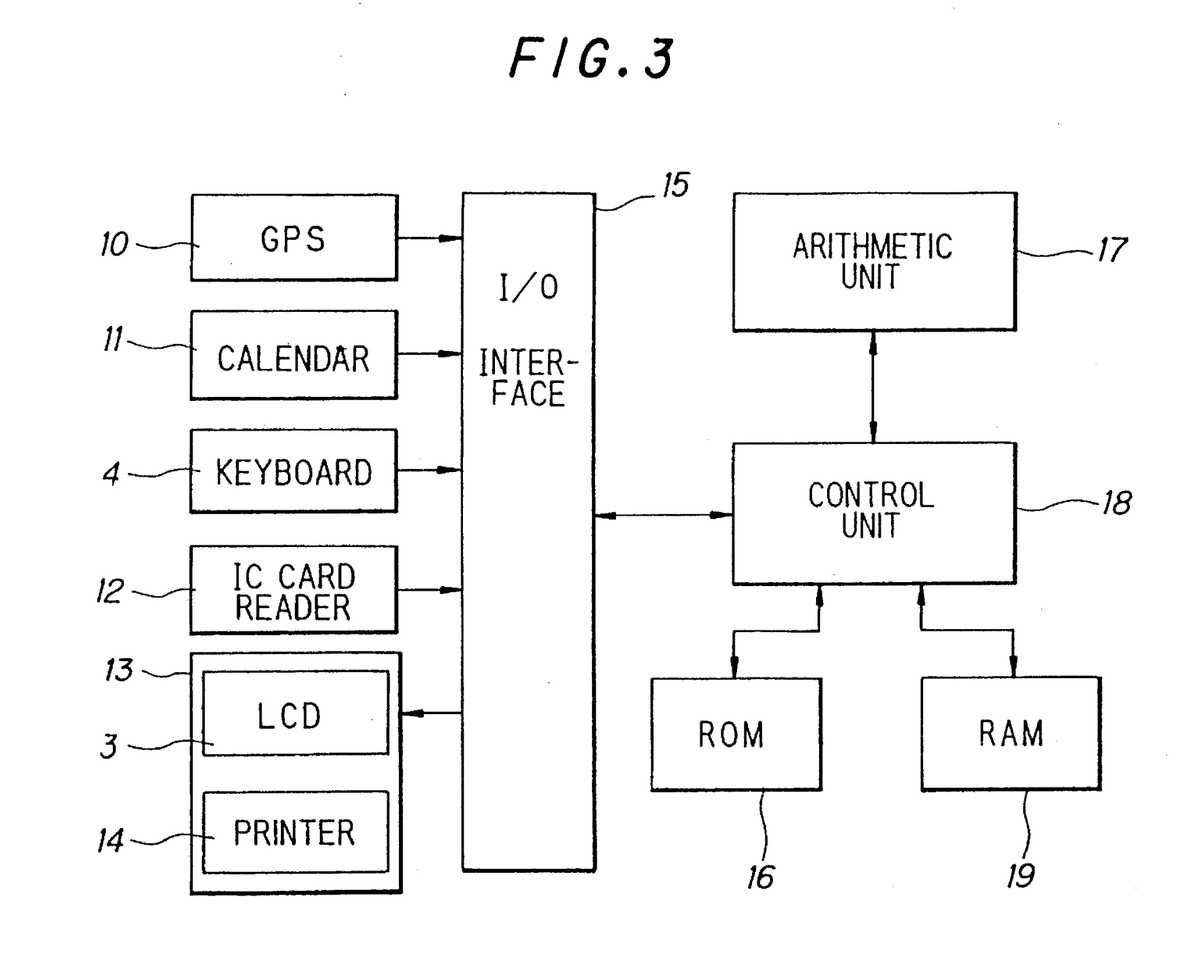
FIG. 3 is a block diagram showing the circuitry structure of the observation system.

FIG. 3 shows the circuitry structure of the natural environment observing system, which includes a satellite navigation receiver (GPS) 10 for receiving radio waves from the plurality of artificial satellites to calculate the latitude, longitude and height above sea level at a position where the observer exists, a calendar 11 for providing the current time, the keyboard 4 before described, an IC card reader 12 for reading the phenomenon data stored in the IC card 9, an information output unit 13 including the LCD 3 and a printer 14, an I/O interface for doing input and output operation, a ROM 16 for storing predetermined programs, a control unit 8 for controlling in accordance with the program in the ROM 16, and a RAM 18 for storing data supplied to the system and data calculated by the arithmetic unit 17.

Figure 4:
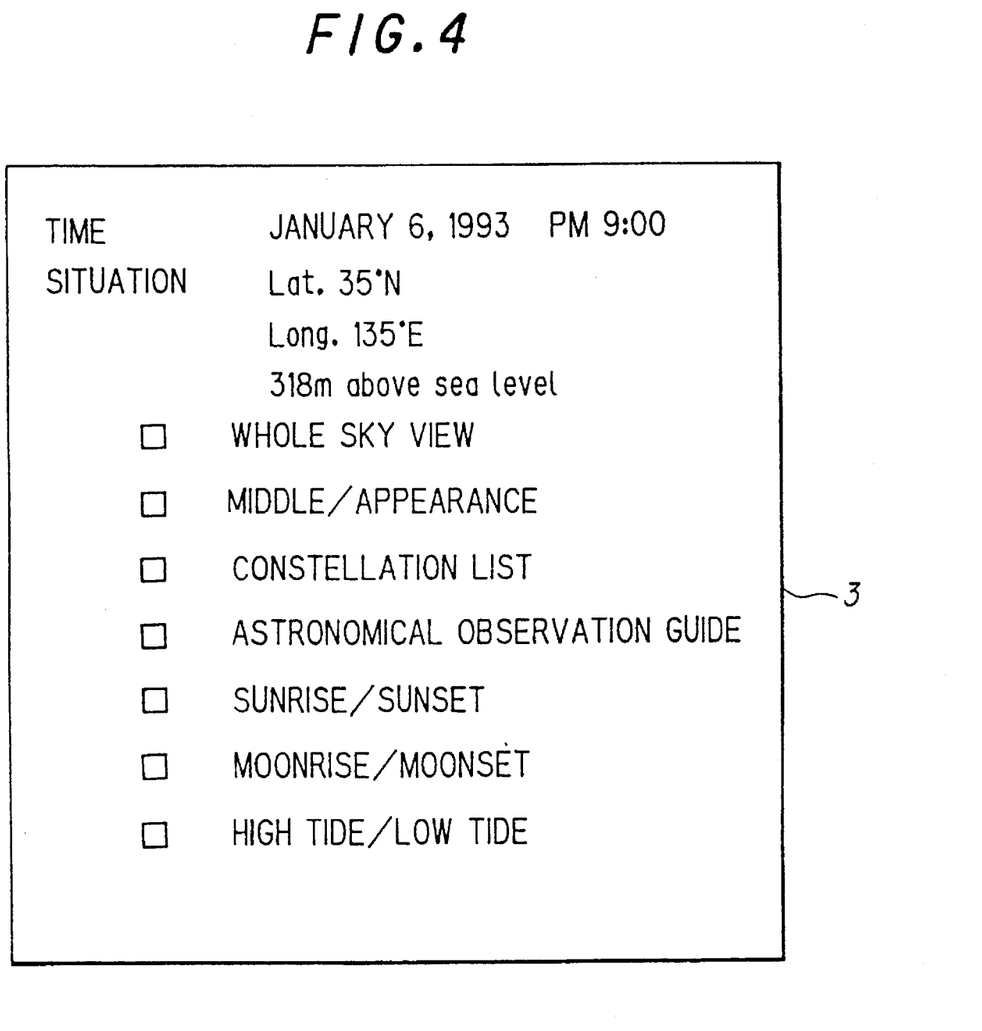
FIG. 4 is an explanatory diagram showing an initial menu which is displayed on an LCD of the observation system.

When the IC card 9 is set in the card setting portion 7 and the power switch 5 of the keyboard 4 is turned on, a location signal indicating the present position and a time signal indicating the present time are supplied from the GPS 10 and calendar 11, respectively. Then, the information is displayed in an initial menu on the LCD 3, as shown in FIG. 4.

Figure 5:
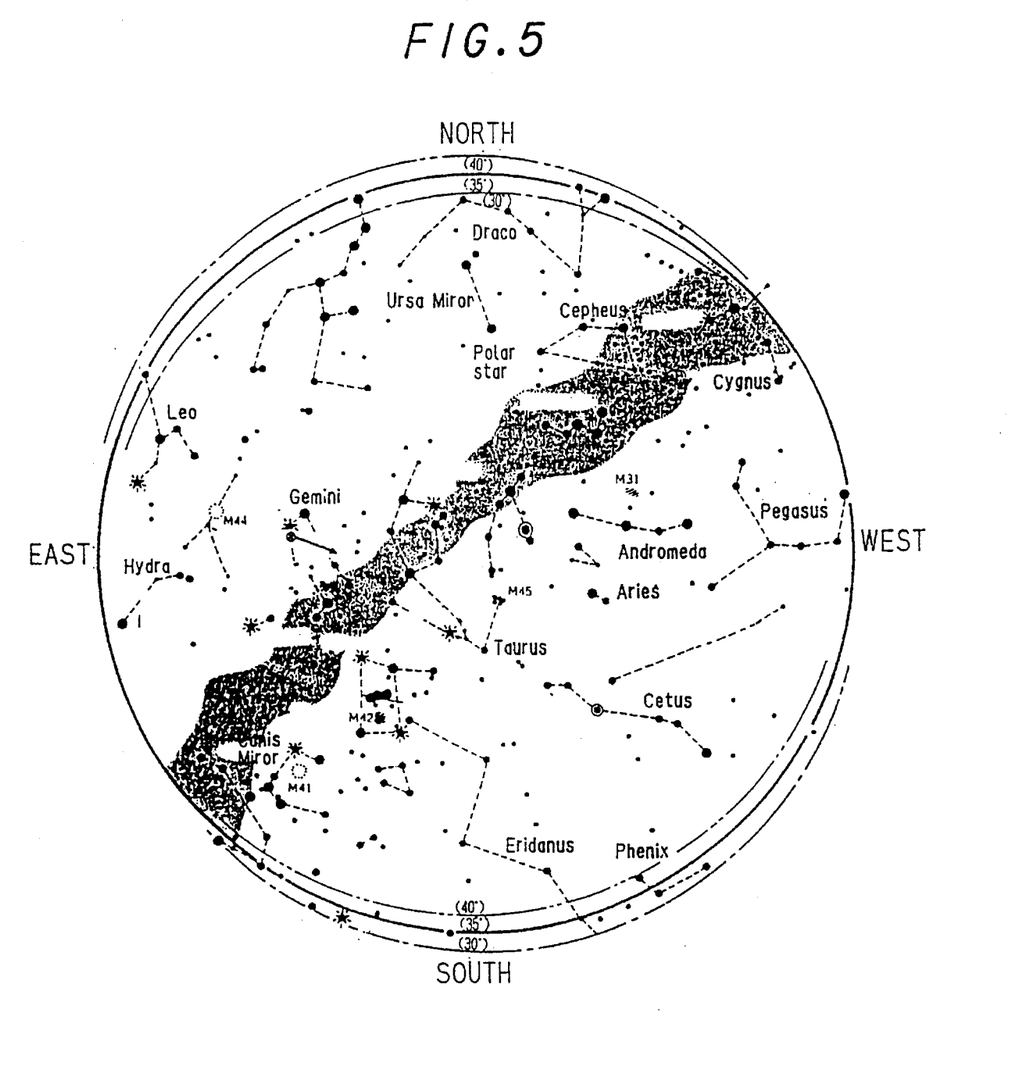
FIGS. 5 and 6 are explanatory diagrams showing whole sky charts which are displayed by the observation system.

A required channel (information) is specified by moving a cursor with the control 6 of the keyboard. If a "Whole Sky View" is specified, orbit data are supplied from the IC card 9 to the IC card reader 12, so that the orbit data are supplied, with the location and time signals, through the I/O interface and control unit 18 to the arithmetic unit 17. The arithmetic unit 17 corrects the orbit data in accordance with the location and time information, and then the corrected data are supplied form the information output unit 13 under control of the control unit 18. For example, as shown in FIG. 4, if the present time and location are "9:00 p.m. Jan. 6, 1993" and "Lat. 35° N. Long. 135° E. 318 m above sea level," respectively, a whole sky chart as shown in FIG. 5 is displayed on the LCD 3 or printed out from the printer 14.

Figure 6:
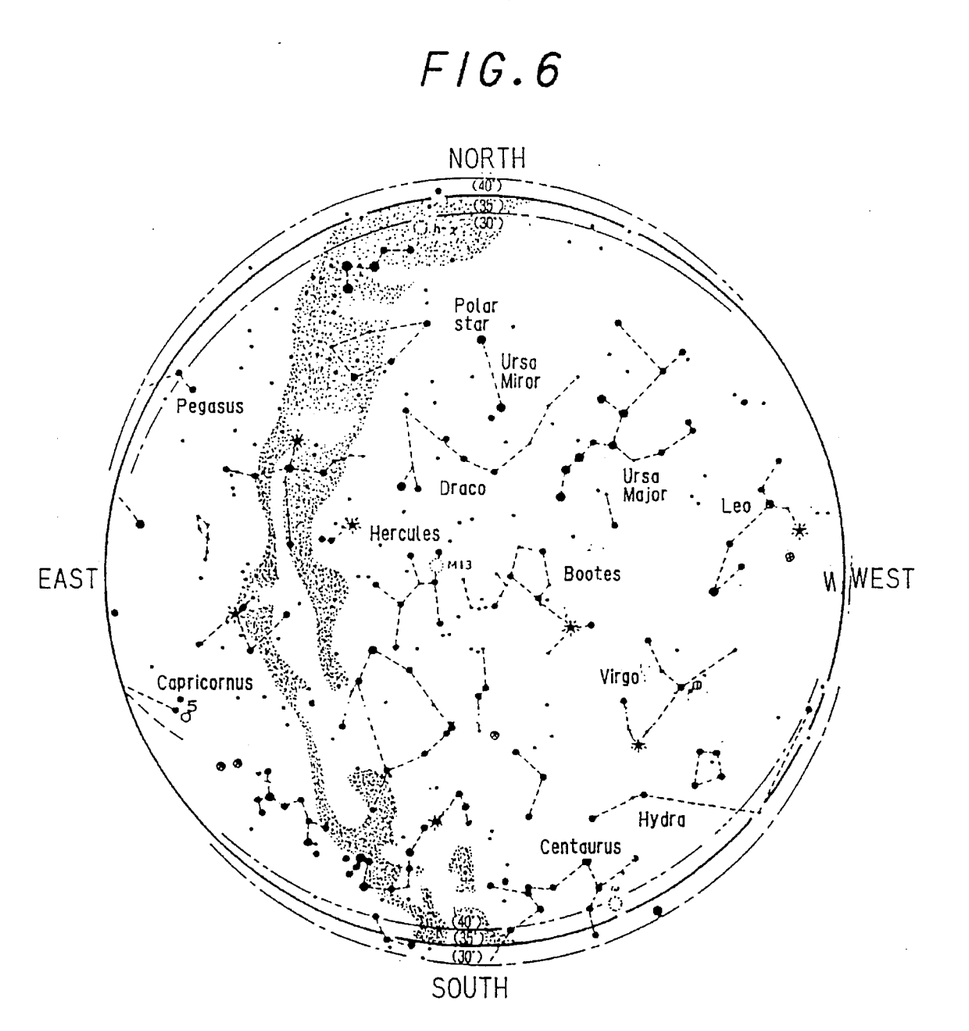

In the whole sky chart, the information for the situation Lat. 30° N. Long. 130° E., and Lat. 40° N. Long. 140° E. are shown in one-dot and two-dot broken lines 100 and 200, respectively. If the present time is 9:00 p.m. Jul. 7, 1993 in the same situation as of FIG. 5, a whole sky chart is as shown in FIG. 6.

Figure 7:
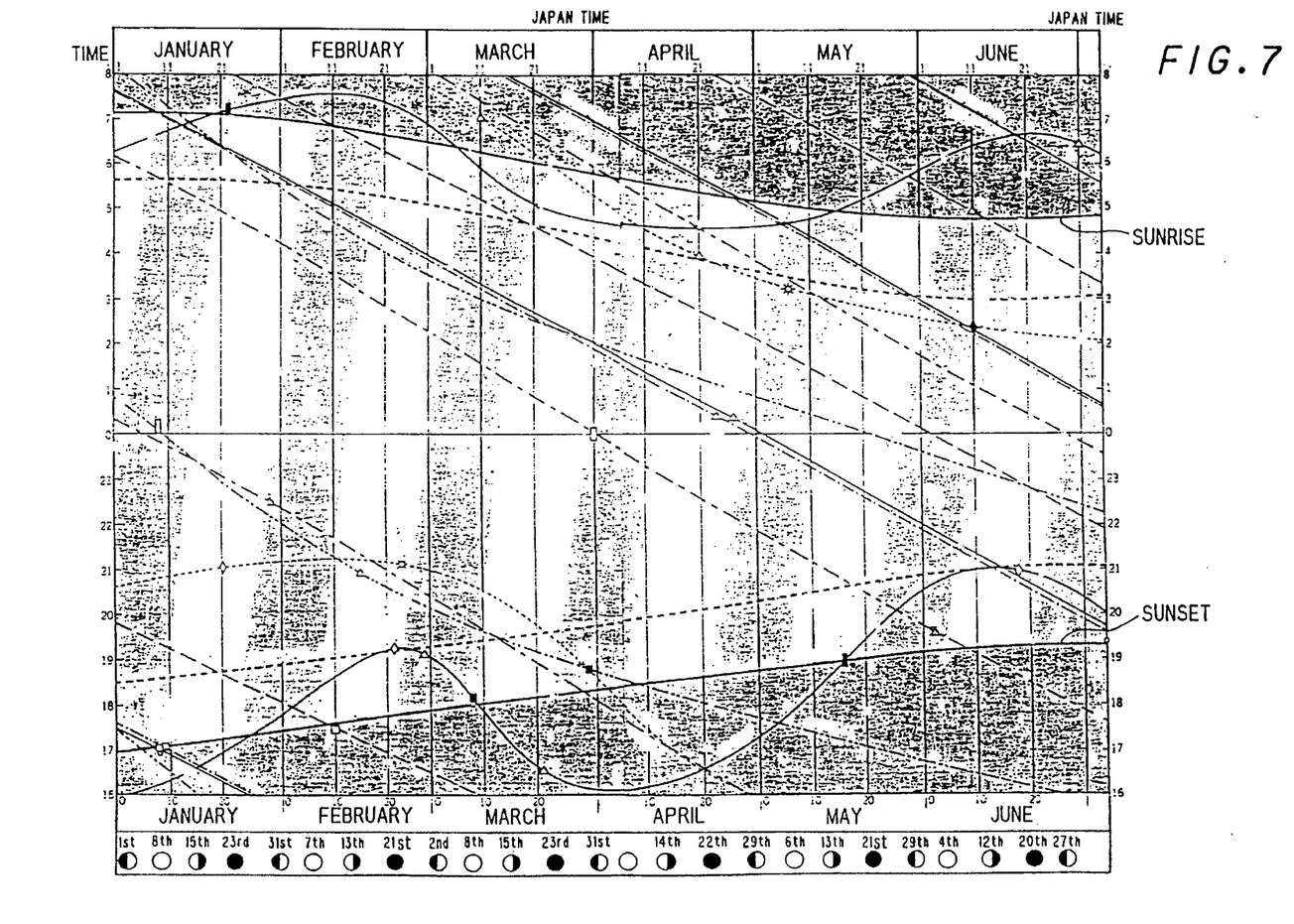
FIG. 7 is an explanatory diagram showing a middle/appearance chart displayed by the observation system.

If a "Middle/Appearance chart" is specified in the initial menu, the astronomical information in the present year in the present position may be displayed. When the present position is at Lat. 35° N. Long. 135° E., a middle/appearance chart for the sun, moon and planets may be displayed as shown in FIG. 7. This chart shows rise, set and middle times of the sun, moon and planets, and the moon faces (shapes, phases), so that the chart is useful for planing for an astronomical observation.

Figure 8:
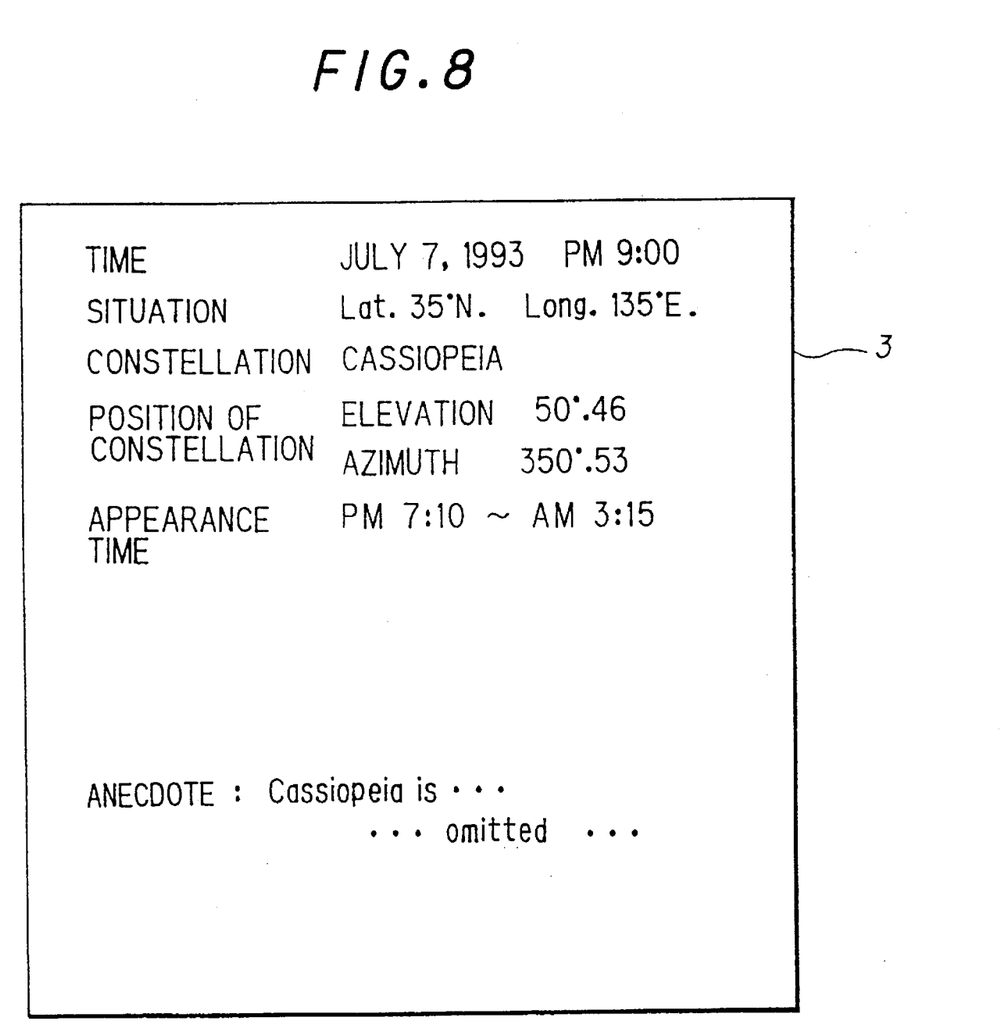
FIG. 8 is an explanatory diagram showing constellation information displayed by the observation system.

If a "Constellation List" is specified in the initial menu, a required constellation may be specified in the following menu. For example, when Cassiopeia is specified, elevation and azimuth angles for observing Cassiopeia are calculated in accordance with information on the orbit of Cassiopeia, present time and location supplied from the IC card 9, and then, rise and set times of Cassiopeia are calculated in accordance with the elevation and azimuth angles. The calculated information is displayed with the anecdote of Cassiopeia on the LCD 3 or printed out from the printer 14, as shown in FIG. 8.

If an "astronomical observation guide" is specified, a list of heavenly bodies that may be observed well at the present time in the present situation is displayed, or suitable location and time are displayed. Further, when an Appearance Time is specified, rise and set times of the sun or moon are displayed on the LCD.

In order to get information on tide, a "High TIDE/LOW TIDE" channel is specified. The IC card 9 stores tide information at a predetermined location (for example, Tokyo bay) and the mean number of alternation of tide at each location, as shown in FIG. 9, according to which high and low tides at the present address are calculated, the high and low tides are supplied from the information output unit 13 as output information.

Figure 10:
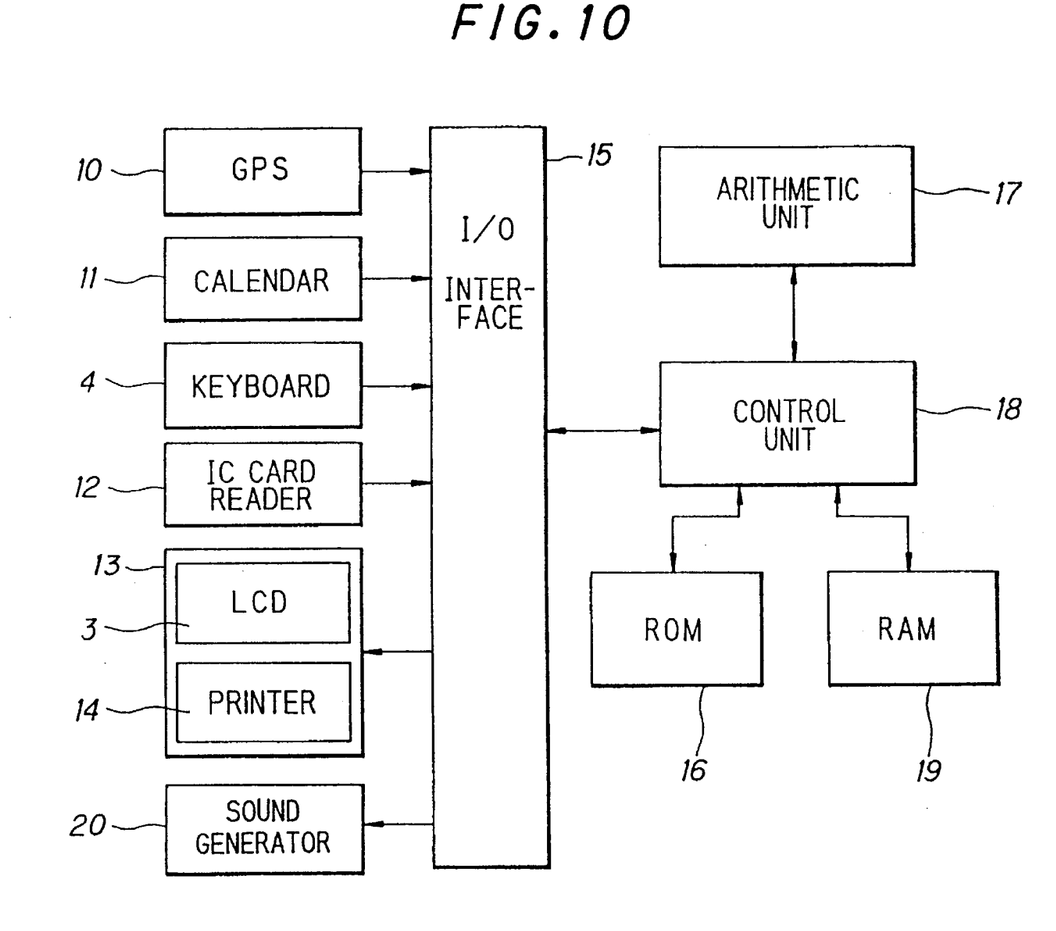
FIG. 10 is a block diagram showing a second preferred embodiment according to the invention.

FIG. 10 shows a second preferred embodiment according to the invention. This embodiment is provided with a sound generator 20 for generating predetermined sound (a time siren) at the time when the calendar 11 points to a predetermined time. When required information on a position of a heavenly body to be observed (for example, an elevation) is supplied to the system with the keyboard 4, a time when the heavenly body reaches at the required position is calculated. When the calendar 11 points to the calculated time, the sound generator 20 gives out the sound. It is difficult to observe a heavenly body at a low elevation angle by effect of the atmosphere, therefore, it is necessary to specify a high elevation angle so that the observer may know the time when the heavenly body reaches at the high elevation angle by the calendar. As a result, the heavenly body may be observed at an optimum angle.

Figure 11:
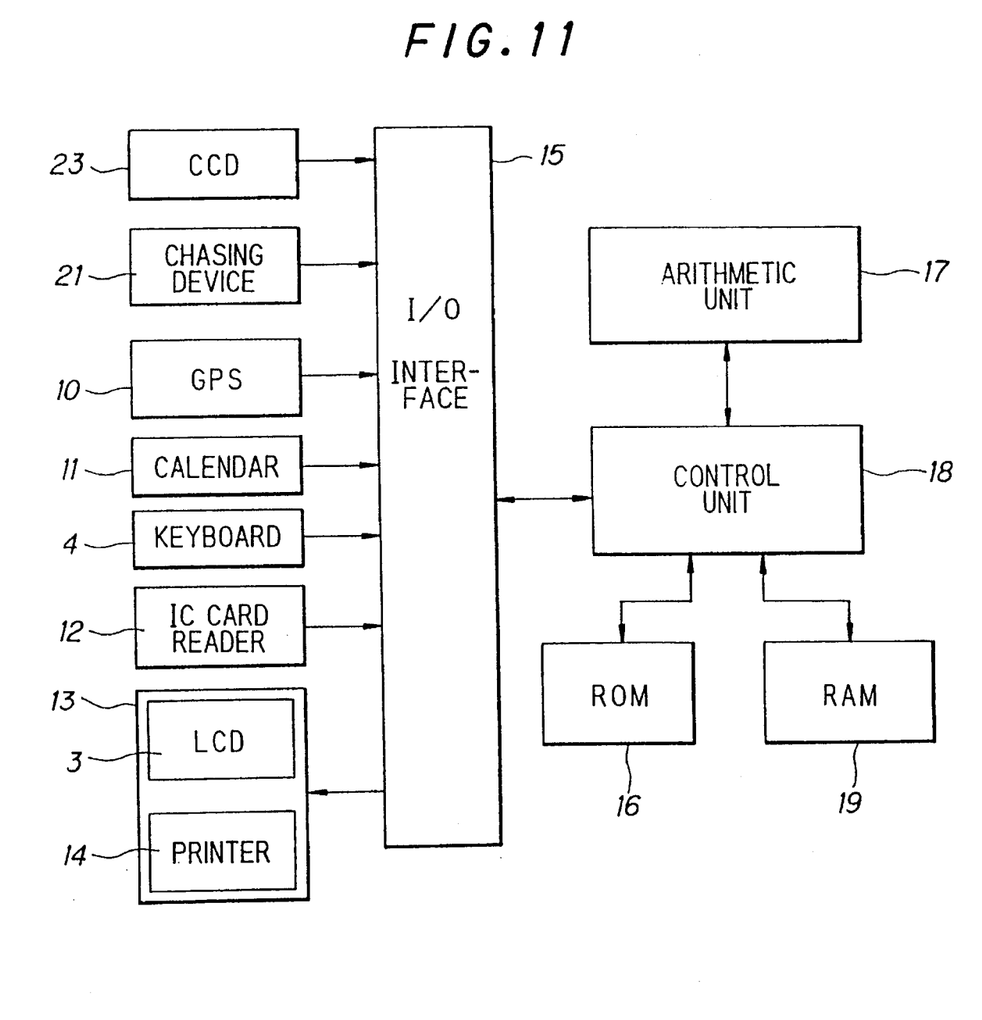
FIG. 11 is a block diagram showing a third preferred embodiment according to the invention.

FIG. 11 shows a third preferred embodiment according to the invention. This embodiment is provided with a chasing device 21 and a CCD (including a lens) 23, which are controlled in angle in accordance with an output of the arithmetic unit 17. In this embodiment, the arithmetic unit 17 calculates the elevation and azimuth angles of a required heavenly body in accordance with the present address and time, and orbit data respectively supplied from the GPS 10, calendar 11 and IC card 9, so that the CCD 22 chases the heavenly body. Image data taken by the CCD 22 are stored in the RAM 19, so that the data may be displayed on the LCD 3 as need. In this embodiment, an equatorial telescope may be employed instead of the CCD 22.

As described above, according to the invention, the natural environment observation system has the calendar function, so that natural environment information may obtained at an optimum time. The observer may know a time when a required phenomenon occurs, so that the observer can not miss an optimum position to see the phenomenon.

In this invention, a storage medium, such as CD-ROM and the like, may be employed instead of the IC card.

I claim:

1. A portable system for observing astronomical and tide-related phenomena in accordance with a present location of a user and a present date and time, comprising:

detection means for detecting the current location of a user;

calendar means for providing the present date and time;

a memory for storing tide-related and astronomical data, including data for a celestial chart showing the arrangement of the constellations;

input means responsive to an operation by the user for supplying an input signal specifying an astronomical or tide-related item to be observed;

data selection means responsive to the input signal for selecting and loading the corresponding data from the memory;

processor means, connected to the detection means, calendar means and data selection means, for modifying the data supplied from the memory through the data selection means in accordance with the current location of the user and the present date and time; and output means responsive to the processor means for showing the modified data.

2. The system according to claim 1, wherein:

said astronomical and tide-related data includes orbit information of celestial bodies; and said output means displays a celestial map showing the arrangement of the celestial bodies.

3. The system according to claim 1, wherein:

said information on astronomical and tide-related data includes orbit information of celestial bodies; and said processor means calculates elevation and azimuth angles and rise and set times of the celestial bodies in accordance with the orbit information thereof, the current location of the user, and the present date and time.

4. The system according to claim 1, wherein:

said information on astronomical and tide-related data includes tide information including high and low tide times at a predetermined reference location; and said processor means modifies said high and low tide times at the reference location to calculate high and low tide times at a location specified by the user.

5. The system according to claim 1, wherein:

said-detection means is a GPS (Global Positioning System).

6. The system according to claim 1, wherein:

said memory is a changeable IC-card; and said data selection means is an IC card reader.

7. The system according to claim 1, wherein:

said output means is an LCD (Liquid Crystal Display) for displaying the output information.

8. The system according to claim 1, wherein:

said output means is a printer for printing the output information.

9. The system according to claim 1, wherein:

said input signal includes information on a specific constellation to be observed;

said processor means calculates a realization time at which the specified constellation will appear; and said output means includes an indicator responsive to the calculated realization time for indicating the fact that the specified constellation appears.

10. The system according to claim 9, wherein:

said indicator is a sound generator for generating a sound at the calculated realization time when the specified constellation appears.

11. A portable system for observing celestial and tidal information, comprising:

detection means for detecting the current location of a user;

calendar means for providing the present date and time;

a memory for storing information on celestial and tidal data, said data including at least high tide and low tide times at predetermined locations and the mean number of alternations of tide at each of said predetermined locations;

input means responsive to an operation by a user for supplying an input signal specifying celestial and tidal information to be observed;

data selection means responsive to the input signal for selecting and loading the corresponding data from the memory;

processor means connected to the detection means, calendar means, and data selection means, for modifying the data supplied from the memory through the data selection means in accordance with the current location of the user and the present date and time;

and display means responsive to the processor means for displaying at least the high tide and low tide times for the user at the current location.

12. The portable system of claim 11, wherein:

said detection means for detecting the current location is a global positioning system (GPS).

13. The portable system of claim 11, wherein:

said information on celestial and tidal data includes orbit information of celestial bodies;

said processor means calculates elevation, azimuth angles, rise, and set times of the celestial bodies in accordance with the orbit information thereof, the current location of the user and the present date and time; and said display means displays a celestial map showing the arrangement of the celestial bodies in response to the calculations of said processor means.

14. A system for observing astronomical information in accordance with a present location of an observer and a present date and time, comprising:

a satellite navigation receiver for detecting the longitude, latitude, and height above sea level of the observer's present location;

a calendar means for providing the present date and time;

a memory for storing astronomical data including orbits of the sun, moon, planets, and constellations;

an input means responsive to the operation of the observer for specifying astronomical information to be observed;

an arithmetic unit programmed to process the astronomical data stored in the memory in accordance with the observer's present location, the present date and time, and the astronomical information specified by the observer;

an information output unit for showing the specified astronomical information; and a control unit for supplying the processed astronomical data to the information output unit, wherein said astronomical information specified by the observer is an elevation of a celestial body, and said arithmetic unit calculates a predetermined time when the celestial body reaches the specified elevation, further comprising:

a sound generator coupled to said control unit for generating a predetermined sound when the time provided by the calendar means coincides with said predetermined time, so that the observer may know a time when the predetermined elevation occurs, and the observer cannot miss an optimum position to see the celestial body.

15. A system for observing tide information in accordance with a present location of an observer and a present date and time, comprising:

a satellite navigation receiver for detecting the longitude, latitude, and height above sea level of the observer's present location;

a calendar means for providing the present date and time;

a memory for storing tide information at predetermined locations and the mean number of alternations of the tide at each location;

an input means responsive to the operation of the observer for specifying the tide information to be observed;

an arithmetic unit programmed to process the tide data stored in the memory in accordance with the observer's present location, the present date and time;

an information output unit for showing the high and low tides times at the present location; and a control unit for supplying the processed tide data to the information output unit.

16. The system of claim 15, further comprising:

a sound generator coupled to said control unit for generating a predetermined sound when the time provided by the calendar means coincides with the time of said high or low tide, so that the observer may know the time when the predetermined tides occur, and the observer cannot miss the high and low tides.

* * * * *